(12) United States Patent
Meakins (10) Patent No.: US 8,348,292 B2
(45) Date of Patent: Jan. 8, 2013

(54) METHODS AND APPARATUS FOR THE PROTECTION OF VEHICLE TIRES

(75) Inventor: Steven J. Meakins, Haxtun, CO (US)

(73) Assignee: Eagle Wing LLC, Haxtun, CO (US)

( * ) Notice: Subject to any disclaimer, the term of this patent is extended or adjusted under 35 U.S.C. 154(b) by 248 days.

(21) Appl. No.: 12/767,650

(22) Filed: Apr. 26, 2010

(65) Prior Publication Data

US 2011/0260425 A1 Oct. 27, 2011

(51) Int. Cl.
*B60R 19/54* (2006.01)
(52) U.S. Cl. .................................................. 280/160.1
(58) Field of Classification Search .................. 280/160, 280/160.1
See application file for complete search history.

(56) References Cited

U.S. PATENT DOCUMENTS

| | | | |
|---|---|---|---|
| 1,149,361 A | 8/1915 | Geiger | |
| 2,645,503 A * | 7/1953 | Johnson | 280/160 |
| 4,144,698 A | 3/1979 | Shelton | |
| 6,648,078 B1 | 11/2003 | Moffett et al. | |
| 7,658,058 B2 | 2/2010 | Pierson | |
| 2010/0043369 A1 | 2/2010 | Coers et al. | |

OTHER PUBLICATIONS

Protect tractor tracks and tires from stubble damage with May Wes tractor stalk stompers, May Wes Manufacturing, Hutchinson MN, http://maywes.com/stalk_stomper_tractors, 2 pages, printed Feb. 26, 2010.
Stubble damage protection, May Wes stalk stomper, level corn stalks ahead of combine tires/tracks, May Wes Manufacturing, Hutchinson MN, http://maywes.com/stalk_stomper_combines, 2 pages, printed Feb. 26, 2010.
Stalk Smasher—Ringsten Welding and Fabrication Inc., www.stalksmasher.com; plus documentation establishing effective date of references as not earlier than Oct. 14, 2010.
Stubble Crusher, www.mindenmachine.com/stubble_crusher.htm; plus documentation establishing effective date of references as not earlier than Oct. 29, 2010.

* cited by examiner

*Primary Examiner* — Jeffrey J Restifo
*Assistant Examiner* — Erez Gurari
(74) *Attorney, Agent, or Firm* — Santangelo Law Offices, P.C.

(57) ABSTRACT

Methods and apparatus may allow for the protection of vehicle tires from ground debris. A swing arm configuration may be used to displace ground debris from the path of a vehicle tire. The length of the swing arm may be established to maximize the vehicle's angle of approach. The motion of the swing arm may be arrested with a swing motion arrest substantially collocated with a swing axis pivot point. A ground debris displacement system may be capable of unpowered operation from a single position on a vehicle.

31 Claims, 5 Drawing Sheets

METHODS AND APPARATUS FOR THE PROTECTION OF VEHICLE TIRES

BACKGROUND OF THE INVENTION

Generally, the inventive technology relates to protecting vehicle tires from damage by ground debris. Specifically, the inventive technology involves methods and apparatus for displacing ground debris into positions that prevent vehicle tire damage. The inventive technology may be particularly suited to protecting farm equipment tires by flattening upright stalks from harvested crops into positions that cannot puncture or otherwise damage such tires.

Ground debris can pose a damage hazard to the tires of many types of vehicles. On roads, harmful ground debris may commonly be encountered in the form of sharp objects such as metal scraps, pieces of wood, and other objects having sharp, upright edges. However, ground debris in agricultural settings can be equally detrimental to vehicle tires. For example, modern techniques for harvesting fibrous crops such as corn, beans, and the like may leave ground debris in the form of stubble—hard, rigid stalks rising several inches from the ground in place of the harvested plants. Not only may this kind of ground debris pose an equal, if not greater, hazard to the tires of farm equipment as compared to road debris, but farm equipment tires may represent a substantial financial investment, often costing in the thousands of dollars. As a result, many conventional technologies may have been developed to protect tires from damage by ground debris, especially for agricultural applications. However, these conventional technologies frequently may have been beset by significant drawbacks.

For example, conventional technologies that form a barrier in front of vehicular tires to block ground debris often must be raised and lowered to and from their blocking position. This often requires power-assisted means, such as hydraulics, electronics, or the like, increasing the cost and complexity of such devices. Moreover, these devices usually must be raised from their blocking position if the vehicle is to travel over rough ground, such as when crossing a ditch or berm, perhaps decreasing the efficiency with which they may be utilized.

Conventional technologies also, for example, frequently may be very mechanically involved, perhaps operating through complex arrangements of interconnected and dependent parts. Such conventional technologies often may use one or more springs, rollers, chains, drag bars, or other such components, perhaps tending to result in expensive, complicated devices that may be large, unwieldy, or otherwise difficult to operate.

The foregoing problems regarding conventional tire protection techniques may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken.

SUMMARY OF THE INVENTION

The inventive technology relates to methods and apparatus for the protection of vehicle tires and may include one or more of the following features: techniques for utilizing a swing arm to displace ground debris; techniques for determining and establishing a swing arm length that maximizes the angle of approach of a vehicle; techniques for arresting the motion of a swing arm with a swing motion arrest substantially collocated with a swing axis pivot point; techniques for utilizing an unpowered ground debris displacement system; techniques for utilizing a single position ground debris displacement system; and various related techniques as described herein. Accordingly, the objects of the methods and apparatus for the protection of vehicle tires described herein address each of the foregoing problems in a practical manner. Naturally, further objects of the inventive technology will become apparent from the description and drawings below.

DETAILED DESCRIPTION OF THE PREFERRED EMBODIMENTS

As mentioned earlier, the present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
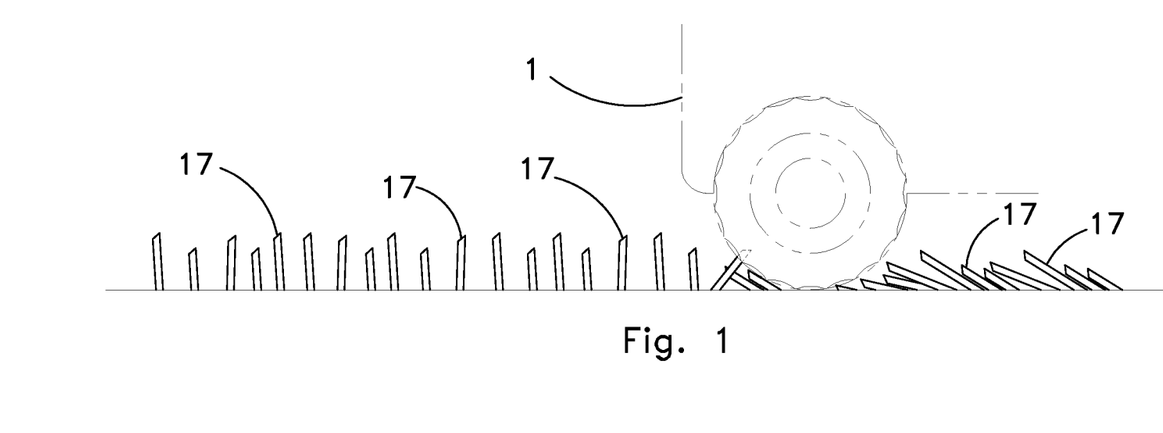
FIG. 1 is a view of a vehicle having an unprotected tire travelling through a path having ground debris.
Figure 2:
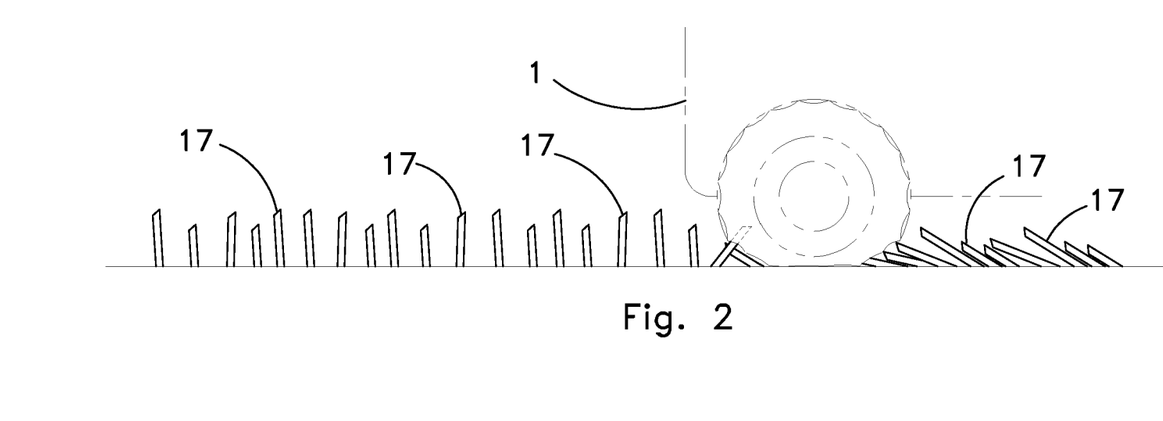
FIG. 2 is a view of a vehicle having an unprotected tire that has sustained damage from ground debris.

The inventive technology may be used with various kinds of vehicles to protect vehicular tires from ground debris. In agricultural applications, such vehicles may include tractors, planters, and other vehicles which typically may be operated in fields or other farm environments. However, the inventive technology naturally may be used for any kind of vehicle, whether operated on-road or off-road, when appropriate to prevent tire damage consistent with the principles discussed herein. Tires, of course, may include the rubber, metal, or other portion placed over a wheel to provide a vehicle with traction, resist wear, and the like, but as used herein, also should be understood to include wheels, treads, tracks, or any other vehicular component contacting the ground for which protection from damage by ground debris may be desirable. Moreover, ground debris may include the debris previously referenced herein, such as agricultural stubble in particular, but more generally may include things lying on or in the ground having the potential to cause damage to tires. Accordingly, various embodiments may involve moving a vehicle (1) through a path having ground debris (17). FIGS. 1 and 2 may illustrate an example of a vehicle (1) having tires (2) becoming damaged by ground debris (17), wherein the inventive technology set forth herein has not been utilized to protect the tires (2).

Figure 3:
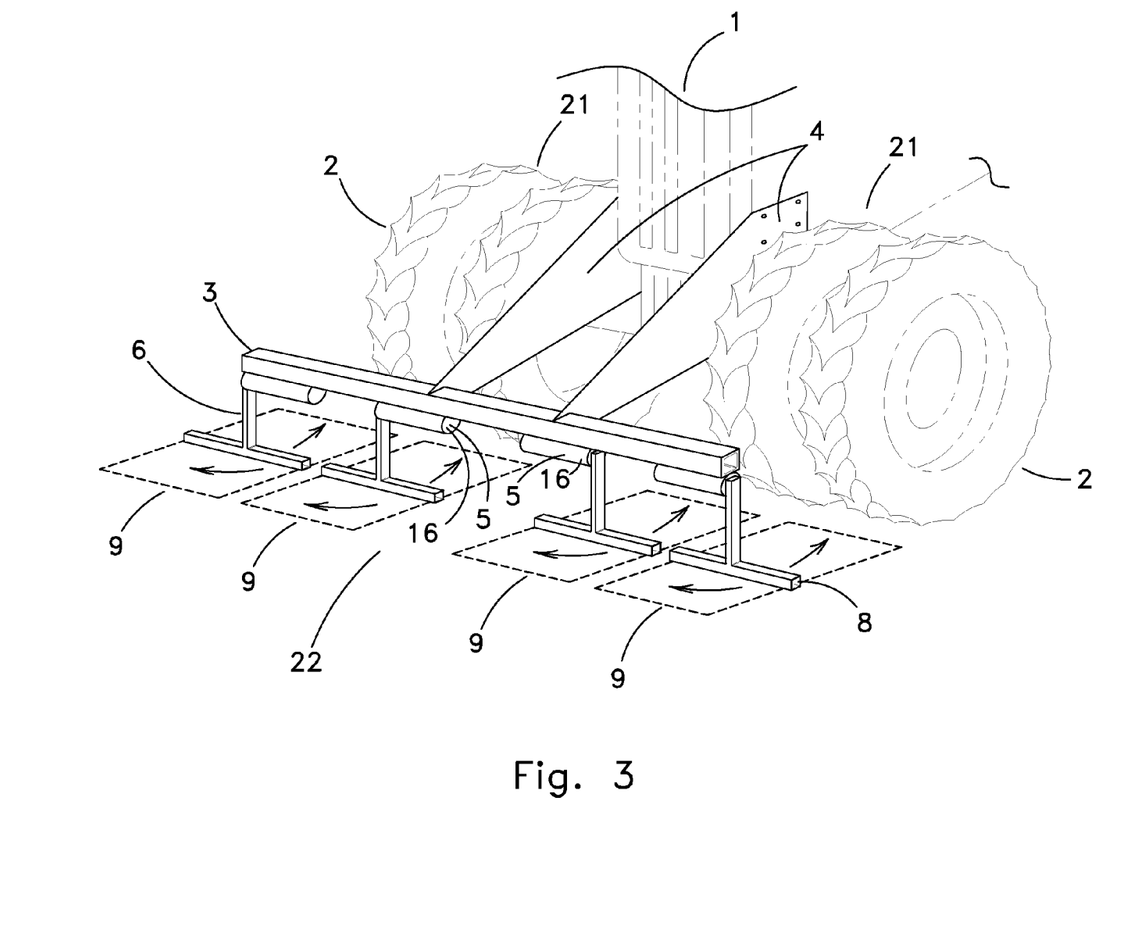
FIG. 3 is a view of a vehicular tire protection apparatus in one exemplary embodiment.

Now with reference primarily to FIG. 3, embodiments of the inventive technology may utilize a swing arm mount (3) configured to be joined to a structural element (4) of a vehicle (1). The swing arm mount (3) may be a firm, stable support upon which one or more swing arms (6) may be mounted, and may provide the interface by which the inventive technology may be joined, directly or indirectly, to the vehicle (1). In some embodiments, for example, the swing arm mount (3) may be a crossbar, such as made of metal or another suitably strong material, attached to the front of the vehicle (1). However, any suitable object consistent with the principles discussed herein may serve as a swing arm mount (3), such as plates, angle irons, or the like.

Naturally, a structural element (4) of a vehicle (1) may be any vehicle component having the requisite strength and interconnection to join to a swing arm mount (3). For example, such structural elements (4) may include the chassis of the vehicle (1), or perhaps vehicle attachment points allowing the swing arm mount (3) to be joined to the front of the vehicle (1), as shown for example in one embodiment in FIG. 3. However, other mounting arrangements are possible, such as perhaps contemplated by a swing arm mount (3) that may be configured to be joined to the wheel assembly (21) of a vehicle (1). This may involve perhaps utilizing the swing arm mount (3) as joined to the wheel, suspension, axle, or other wheel component of the vehicle (1), perhaps allowing the mount to move with the movement of the vehicle's wheel, and not with the movement of the vehicle's body.

The swing arm mount (3) may have one or more swing axis pivot points (5) joined thereto to provide an axis of pivot about which corresponding swing arms (6) may rotate. Examples of swing axis pivot points (5) may include tubes, pins, bearings, or any other suitable interface enabling rotational movement of a swing arm (6) about the axis of pivot. In some embodiments, a swing arm mount (3) may be provided with multiple swing axis pivot points (5), such as corresponding to the number of multiple tires of the vehicle (1). In FIG. 3, for example, four torsion tubes may serve as swing axis pivot points (5) mounted to a crossbar corresponding to the four front tires (2) of the vehicle (1). Additionally, as shown for example in FIG. 4, a swing axis pivot point (5) in some embodiments may be bi-directional, as in capable of pivoting in both a clockwise and counter-clockwise direction. Accordingly, various embodiments may involve utilizing a swing axis pivot point (5) as joined to a swing arm mount (3), for example such as by bi-directionally rotating the swing arm (6) about a swing axis pivot point (5).

A swing arm (6) may be joined to each swing axis pivot point (5) and may be configured to rotate at the swing axis pivot point (5). The swing arm (6) may allow for the creation of a rotational arc (19), in as much as one end portion of the swing arm (6) may be joined to the swing axis pivot point (5), and the opposite end portion of the swing arm (6) may be free to move through the rotational arc (19) created as the first end portion rotates about the axis of pivot. Examples of swing arms (6) may include bars, rods, wedges, or indeed any suitable objects having a sufficient lengthwise axis to permit movement of the object through the rotational arc (19). In FIG. 3, for example, the swing arms (6) may be metal bars. Accordingly, various embodiments may involve rotating a swing arm (6) about a swing axis pivot point (5).

Figure 5:
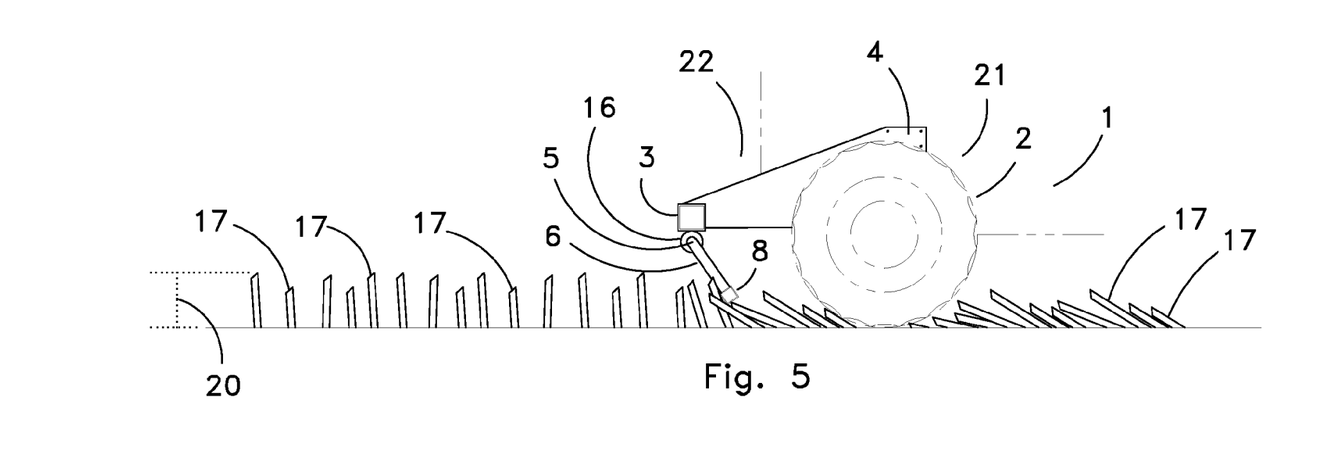
FIG. 5 is a view of the utilization of an unpowered ground debris displacement system to displace ground debris in one exemplary embodiment.

A ground debris displacement member (8) may be joined to each swing arm (6) at a tire lead position (9) in order to displace ground debris (17) from positions which may cause damage to vehicle tires (2). The ground debris displacement member (8) may have any shape or form consistent with the principles discussed herein so as to physically impact, move, or otherwise change the state of debris on the ground such that it no longer poses a damage hazard to the tires (2). For example, as shown in FIG. 5, a ground debris displacement member (17) may displace agricultural debris, such as the stubble previously described herein, by folding it over or otherwise flattening it so that it no longer poses a puncture or other upright damage hazard to the tires (2) of a vehicle (1). Examples of ground debris displacement members (8) may include bars, rods, wedges, or indeed any suitable objects sufficient to displace ground debris (17) that the member may come into contact with.

In FIG. 3, for example, the ground debris displacement members (17) may be horizontal bars placed at the end of the swing arms (6), perhaps such that each swing arm (6) and ground debris displacement member (8) forms a T-shaped assembly. In some embodiments, a rounded surface may be utilized for the ground debris displacement member (8), such as a rounded rod, in order to reduce resistance as the displacement member contacts ground debris (17). Accordingly, various embodiments may involve displacing ground debris (17) with a ground debris displacement member (8) joined to a swing arm (6) in a T-shaped assembly.

Moreover, FIG. 3 illustrates that ground displacement members (8) may be positioned to correspond to vehicle tires (2) at tire lead positions (9). Naturally, such placement ensures that the displacement members lead the tires (2), such that ground debris (17) lying immediately before each tire (2) is cleared by the displacement member. It should be noted that tire lead positions (9) are not limited to the substantially vertical arrangement of the swing axis pivot points (5), swing arms (6), and ground debris displacement members (8) in FIG. 3—rather, any arrangement of these components resulting in a tire lead position (9) may be utilized. Accordingly, various embodiments may involve displacing ground debris (17) with a ground debris displacement member (8) joined to a swing arm (6) in a position that leads the tire (2).

In some embodiments, a tire lead position (9) may be a proximal tire lead position (9), perhaps allowing the ground debris displacement member (8) to be positioned proximally to the tire (2). For example, the vehicular angle of approach maximization aspects discussed elsewhere herein may enable a compact dimensionality of the inventive technology, perhaps allowing placement of the ground debris displacement member (8) to be proximally closer to the tire (2) than may have been achieved by conventional tire protection technologies. For example, reducing the interstitial distance (15) in some embodiments may allow the ground debris displacement member (8) to be moved correspondingly closer to the tire (2), perhaps placing it in a reduced interstitial distance proportioned tire lead position (9). Accordingly, various embodiments may involve a ground debris displacement member (8) that proximally leads a tire (2), for example at a distance proportional to a reduced interstitial distance (15).

The ground debris displacement members (8) also may be placed at a ground debris interference position (20). This may ensure that the displacement members are positioned at a height at which the ground debris (17) is located, so that the debris appropriately may be displaced by the members. Such interference, of course, may include physically impacting, moving, or otherwise changing the state of the ground debris (17) such that it no longer poses a damage hazard to the tires (2). FIG. 5 shows an example of a ground debris interference position (20) in one embodiment, though naturally the position may vary depending on the type of debris encountered. Accordingly, various embodiments may involve interfering with ground debris (17) with a ground debris displacement member (8).

In various embodiments, swing arm (6) may have a vehicular angle of approach maximization length (7). While the angle of approach of a vehicle is a term that may be well understood in the art, in general it may be understood as the angle between the ground and a line running from the tire to the front most element of a vehicle (1) when viewed from the side. This angle generally may give an indication of how steep a ramp a vehicle (1) can negotiate without damage, and generally indicate the vehicle's (1) ability to negotiate obstacles such as ditches or berms without hitting and potentially damaging the vehicle's (1) front element. Conventional tire protection technologies frequently may involve adding a sizable attachment to the front of the vehicle (1), thus perhaps increasing the vehicle's overhang, decreasing the vehicle's (1) angle of approach, and reducing the vehicle's (1) ability to negotiate obstacles.

Figure 4:
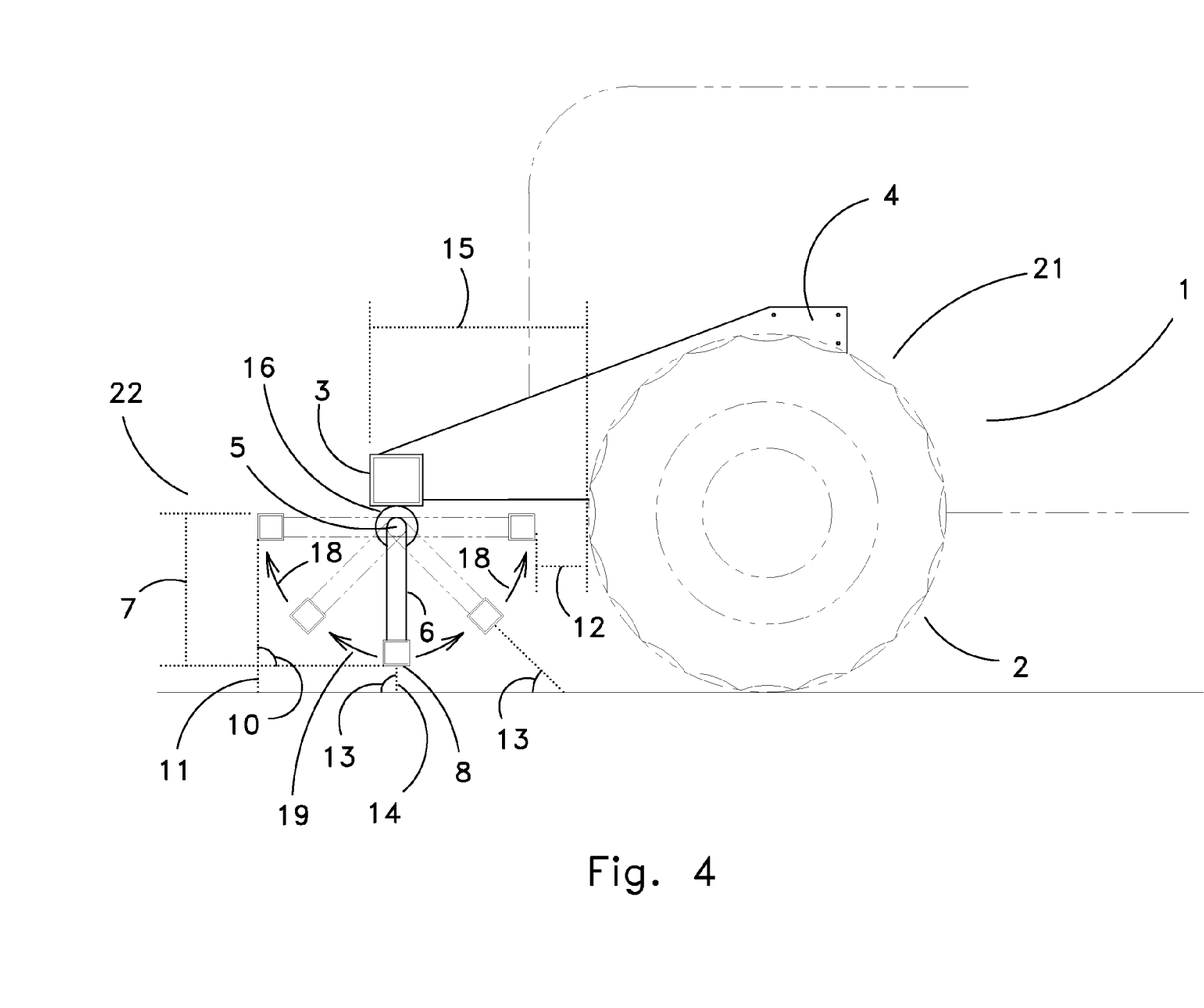
FIG. 4 is a view of a swing arm having a vehicular angle of approach maximization length and a swing motion arrest in one exemplary embodiment.

Now with reference primarily to FIG. 4, a vehicular angle of approach maximization length (7) may tend to reduce the length of the swing arm (6), perhaps allowing the front element of the vehicle (1) to be more closely positioned to the tire (2), thereby perhaps increasing the vehicle's (1) angle of approach and ability to negotiate obstacles. Establishing the length of the swing arm (6) in this manner may be understood as tending to maximize the vehicle's angle of approach, although maximization should be understood as encompassing not only the literal maximum angle of approach possible, but also including all angles of approach tending toward such absolute maximum that perhaps may improve on the angles of approach possible with conventional tire protection technologies. Accordingly, various embodiments may involve rotating the swing arm (6) about a swing axis pivot point (5) at a swing arm (6) length that maximizes the angle of approach of the vehicle (1).

In some embodiments, a vehicular angle of approach maximization length (7) simply may be a shortened functional length of the swing arm (6), wherein the length of the swing arm (6) may be established to be as short as possible while still functioning to displace ground debris (17). However, such a shortened functional length of a swing arm (6) should be understood as encompassing not only the absolute shortest functional length possible, but also including all lengths tending toward such shortest possible functional length that perhaps may improve on the vehicular angles of approach possible with conventional tire protection technologies. In certain embodiments, a vehicular angle of approach maximization length (7) of a swing arm (6) may be 12 to 15 inches from the swing axis pivot point (5), though naturally this length may vary depending on the height of the swing arm mount (3) above the ground, the size of the tire (2), and other relevant dimensions of the vehicle (1). Accordingly, various embodiments may involve rotating a swing arm (6) at a shortened functional length.

In some embodiments, a vehicular angle of approach maximization length (7) may be a swing arc extension (10) maximization length. As may be seen in FIG. 4, a swing arm (6) may be allowed to rotate through a rotational arc (19). Accordingly, the length of the swing arm (6) may be established to maximize the extension of the rotational arc (19), for example perhaps by permitting the swing arm (10) to move through 70, 80, or even 90 degrees of arc (measured from a starting position vertical to the ground). In certain embodiments, this may involve a rotational arc (19) having one or both of a ground clearance distance (11) and a tire clearance distance (12). Naturally, it may be appreciated that allowing the swing arm (6) to clear the ground and the tire (2) will allow the swing arm a greater extension of arc. Any tire clearance distance (12) sufficient to prevent the swing arm (6) from interfering with the tire may be utilized, though the tire clearance distance (12) may be minimized in some embodiments to achieve a more effective ground debris interference position (20), as described elsewhere herein. In some embodiments, a tire clearance distance of 1 inch or less for a swing arc extension (10) through 90 degrees of arc may be effective. With respect to the ground clearance distance (11), this distance may be selected to position the ground debris displacement member (8) at an appropriate ground debris interference position (20), as described elsewhere herein. In some embodiments, a ground clearance distance may range from 0.25 inches to 5 inches, perhaps operating preferably from 2 inches to 4 inches, though naturally this distance may vary depending on the type of ground debris (17) and dimensions of the vehicle (1) involved. Accordingly, embodiments may involve rotating the swing arm (6) at a swing arc extension (10) maximization length, such as perhaps at a ground clearance distance (11) and a tire clearance distance (12).

In some embodiments, a vehicular angle of approach maximization length (7) may be a length sufficient to maintain the swing arm (6) at a high ground angle (13) in a neutral position (14). A neutral position (14) of the swing arm (6) may be a position of the swing arm (6) at rest, such as when the swing arm (6) is not being acted on through contact with ground debris (17). This neutral position (14) of the swing arm (6) often may be substantially vertical to the ground, as when the swing arm (6) may freely hang by gravity, although embodiments may involve biasing the swing arm (6) into some other position at rest, as described elsewhere herein. As may be seen in FIG. 4, the ground angle (13) of the swing arm (6) may be formed by the angle between the ground and a line drawn from the swing axis pivot point (5) along the length of the swing arm (6) to the ground, and may range from 90 degrees when the swing arm (6) is vertical to the ground to 0 degrees when the swing arm (6) is parallel to the ground. It may be seen from FIG. 4 that the length of the swing arm (6) must be shortest when the swing arm (6) is to be able to achieve its highest possible ground angle (13) of 90 degrees, at which point it would be substantially vertical to the ground. This shortest length of the swing arm (6) correspondingly may allow the vehicle's (1) angle of approach to be maximized. However, a high ground angle (13) should be understood as encompassing not only the absolute highest possible ground angle (13) of 90 degrees, but also including all ground angles (13) tending toward such absolute maximum that perhaps may improve on the angles of approach possible with respect to conventional tire protection technologies. Accordingly, various embodiments may involve rotating the swing arm (6) from a high ground angle (13) in a neutral position (14), such as perhaps a neutral position (14) substantially vertical to the ground.

In some embodiments, a vehicular angle of approach maximization length (7) may be an interstitial distance (15) reduction length. With reference to FIG. 4, an interstitial distance (15) may be the distance from the front of the swing arm mount (3) to the vehicle's tire (2). Naturally, it may be seen that reducing this distance will increase the vehicle's (1) angle of approach. An interstitial distance (15) reduction length of a swing arm (6) may facilitate reducing this distance by reducing the space required between the tire (2) and the swing arm (6) when the swing arm (6) is in extension. For example, if the swing arm (6) is to be allowed to swing through 90 degrees of arc (measured from a starting position substantially vertical to the ground), then an interstitial distance (15) reduction length may be a swing arm (6) length simply less than the desired interstitial distance (15). If the swing arm (6) need not swing through such 90 degrees of arc, then the swing arm (6) may be made longer than the desired interstitial distance (15), for example perhaps up to 110 percent of the interstitial distance (15), while still permitting a reasonable swing arc extension (10) that clears the vehicle's tire (2). Accordingly, various embodiments may involve rotating the swing arm (6) at a reduced interstitial length, such as perhaps a length less than the interstitial distance (15), or perhaps a length from equal to 110 percent of the interstitial distance (15).

With further reference primarily to FIG. 4, various embodiments may include a swing motion arrest (16) substantially collocated with the swing axis pivot point (5). The swing motion arrest (16) may act to check the motion of the swing arm (6) moving through its rotational arc (19). Such a check may be accomplished in any suitable manner consistent with the principles set forth herein, such as by braking, elastic resistance, or the like. Naturally, the swing arm (6) may be configured to be arrested by the swing motion arrest (16).

An elastic swing motion arrest, in particular, may use an elastomer to check the motion of the swing arm (6). The elastomer may provide elastic resistance when compressed, expanded, deformed, or the like, by the motion of the swing arm (6). Such elastic resistance may tend to oppose the swing arm's (6) direction of swing and seek to return the swing arm (6) to its original position. The nature and degree of resistance may be governed by the elastic properties of the elastomer, for example in some embodiments exhibiting linearly increasing resistance, or perhaps resistance in accordance with the Spring Equation, Hooke's Law, or the like. For example, the swing motion arrest (16) shown in FIG. 4 may be a torsion tube, wherein rotation of the swing arm (6) may cause elastic compression of the torsion tube that increases with the extension of swing, perhaps providing an increasingly resistive force tending to counteract the swing motion as the swing arm (6) moves through its rotational arc (19). While the variety of torsion tubes known and used in the art generally may be suitable for use as a swing motion arrest (16), a torsion tube typically may be understood to have a tubular structure with an elastic material disposed within that elastically resists torque applied along an axis running through the tube's length. Accordingly, embodiments may involve elastically arresting the motion of the swing arm (6) with an elastic swing motion arrest (16), for example a torsion tube.

Regardless of how the swing motion arrest (16) is implemented, in some embodiments it may serve as a neutral position (14) bias for the swing arm (6). In particular, the arrest element of the swing motion arrest (16) may be configured to position the swing arm (6) at a desired ground angle (13) when at rest. In some embodiments, such as shown in FIG. 4, the neutral position (14) bias may bias the swing arm (6) into a position substantially vertical to the ground. However, it may be appreciated that the swing arm (6) may be biased to any ground angle (13) by a neutral position (14) bias. Accordingly, various embodiments may involve biasing the swing arm (6) to a neutral position (14), such as a position substantially vertical to the ground.

The swing motion arrest (16) in some embodiments may serve as a swing arc extension (10) limiter. In particular, the arrest element of the swing motion arrest (16) may be configured to limit the extension of arc through which the swing arm (6) may rotate. In FIG. 4, for example, the swing motion arrest (16) is shown as a swing arc extension (10) limiter limiting the rotational arc (19) to 90 degrees in either direction (starting from a position substantially vertical to the ground). However, it may be appreciated that the swing arc extension (10) may be limited to any suitable value. Accordingly, various embodiments may involve limiting a swing arc extension (10).

In some embodiments, the swing motion arrest (16) may be a pivot point displacement force appliance. For example, it may be appreciated that the arresting force of the swing motion arrest (16) may be utilized to displace ground debris. In particular, as shown for example in FIG. 5, as the vehicle (1) moves through a path having ground debris (17), and the ground debris displacement member (8) contacts the ground debris (17), the ground debris (17) may resist displacement by pushing back on the swing arm (6). In such instances, the swing motion arrest (16) may gradually increase the resisting force as the swing arm (6) rotates through its rotational arc (19). Naturally, this will increase the force applied by the ground debris displacement member (8) to the ground debris, perhaps ultimately displacing the ground debris (17) from its hazardous position. Since the swing motion arrest (16) may be substantially collocated with the swing axis pivot (5), this displacement force can be seen as being applied at the pivot point, and the swing motion arrest (16) can be seen to serve as a pivot point displacement force appliance. This may be noted in distinction to conventional tire protection technologies, which may apply displacement forces at locations other than such pivot points. Accordingly, various embodiments may involve applying a pivot point displacement force.

Collocation of the swing motion arrest (16) may involve placing it at or in close proximity to the swing axis pivot point (5). For example, the collocated swing arm arrest (16) shown in FIG. 4 may be at the swing axis pivot point (5), as wherein the pivot point may be concentrically disposed within the torsion tube, such that the torsion tube interfaces directly with and acts directly on the pivot point during the pivot motion. However, the collocation of a swing motion arrest (16) should be understood as encompassing not only collocation at the swing axis pivot point (5), but also including locations in close proximity to the swing axis pivot point (5) so as to act on the swing axis pivot point (5), directly or indirectly, in closer proximity than may have been achieved with conventional tire protection technologies. Accordingly, various embodiments may involve arresting the motion of the swing arm (6) with a swing motion arrest (16) substantially collocated with a swing axis pivot point (5).

The inventive technology described herein in various embodiments may be utilized in a ground debris displacement system (22). Such a system may allow a vehicle (1) to displace harmful ground debris from the vehicle's (1) path of travel, thus perhaps protecting the tires (2) of the vehicle (1). In various embodiments, the ground debris displacement system (22) may be unpowered, perhaps having the ability to be operated without the assistance of any powered systems such as hydraulics, electronics, pneumatics, or the like. This may be distinguished from many conventional tire protection technologies, which may require some degree of powered assistance. Accordingly, various embodiments may involve utilizing an unpowered ground debris displacement system (22).

Figure 6:
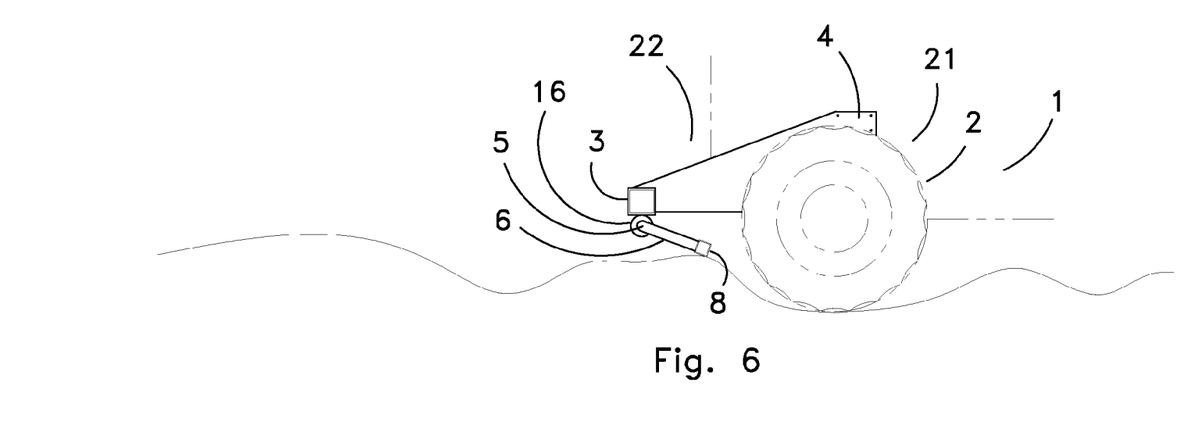
FIG. 6 is a view of the utilization of a single position ground debris displacement system to permit vehicular travel over rough ground in one exemplary embodiment.
Figure 7:
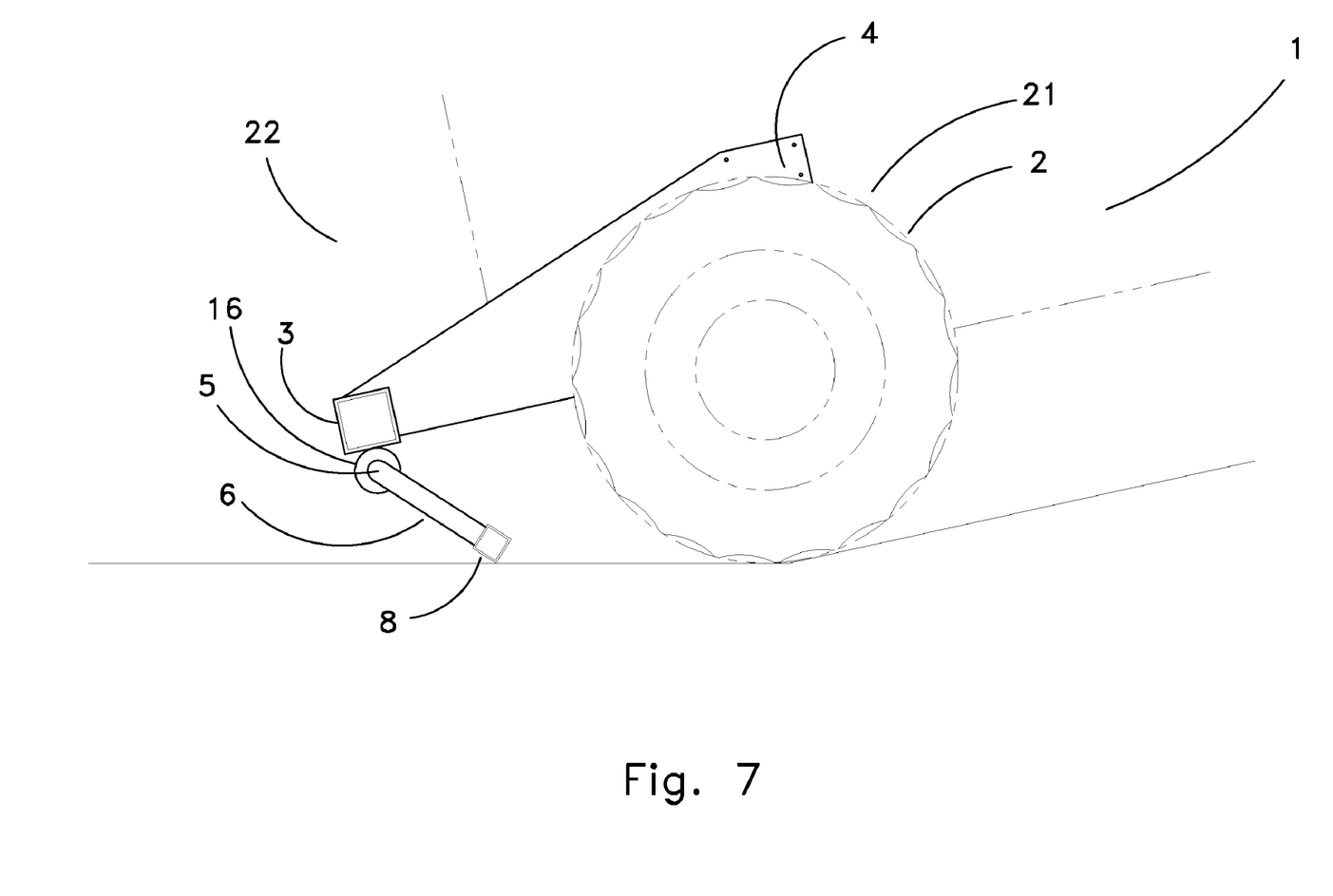
FIG. 7 is a view of the utilization of a single position ground debris displacement system to permit vehicular travel on a slope in one exemplary embodiment.

The ground debris displacement system (22) in various embodiments also may be a single position ground debris displacement system (22). Such a system may be capable of placement on a vehicle (1) in a fixed position, without needing positional adjustment depending on how the vehicle (1) is operating. For example, conventional tire protection technologies may need to be raised and lowered depending on where the vehicle is operating, such as in a field having ground debris (17) (in which case the conventional system may need to be lowered to be engaged) versus simply moving from one location to another (in which case the conventional system may need to be raised to prevent damage). As shown for example in FIGS. 6 and 7, it may be appreciated that the single position ground debris placement system (22) may not need to be raised and lowered, in as much as the swing arm (6) configuration may permit the system to accommodate rough terrain, angled terrain, or the like. Accordingly, various embodiments may involve utilizing a single position ground debris displacement system (22).

As may be easily understood from the foregoing, the basic concepts of the present inventive technology may be embodied in a variety of ways. It involves both ground debris displacement techniques as well as devices to accomplish the appropriate ground debris displacement. In this application, the ground debris displacement techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "pivot" should be understood to encompass disclosure of the act of "pivoting"—whether explicitly discussed or not—and, conversely, were there effectively disclosure of the act of "pivoting", such a disclosure should be understood to encompass disclosure of a "pivot" and even a "means for pivoting" Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these inventive technology(s) such statements are expressly not to be considered as made by the applicant(s).

Thus, the applicant(s) should be understood to have support to claim and make a statement of invention to at least: i) each of the ground debris displacement devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A vehicular tire protection apparatus comprising:
    a swing arm mount configured to be joined to a structural element of a vehicle;
    a bi-directional swing axis pivot point joined to said swing arm mount;
    a swing arm having a vehicular angle of approach maximization length joined to said bi-directional swing axis pivot point and configured to bi-directionally rotate at said swing axis pivot point;
    a rotational arc of said swing arm about said bi-directional swing axis pivot point having a ground clearance distance;
    a swing motion arrest substantially collocated with said bi-directional swing axis pivot point;
    a neutral position of said swing arm substantially vertical to the ground biased by said swing motion arrest;
    a ground debris displacement member joined to said swing arm at a proximal tire lead position;
    and wherein said swing motion arrest comprises a torsion tube.

2. A vehicular tire protection apparatus as described in claim 1 wherein said vehicular angle of approach maximization length comprises a length comprises a length from about 12 inches to about 15 inches.

3. A vehicular tire protection apparatus as described in claim 1 wherein said swing motion arrest comprises a pivot point displacement force appliance.

4. A vehicular tire protection apparatus as described in claim 1 further comprising an unpowered ground debris displacement system.

5. A vehicular tire protection apparatus as described in claim 1 further comprising a single position ground debris displacement system.

6. A vehicular tire protection apparatus comprising:
a swing arm mount configured to be joined to a structural element of a vehicle;
a swing axis pivot point joined to said swing arm mount;
a swing arm having a vehicular angle of approach maximization length joined to said swing axis pivot point and configured to rotate at said swing axis pivot point;
a ground debris displacement member joined to said swing arm at a proximal tire lead position;
and further comprising a swing motion arrest substantially collocated with said swing axis pivot point, wherein said swing motion arrest comprises an elastic swing motion arrest.

7. A vehicular tire protection apparatus as described in claim 6 wherein said vehicular angle of approach maximization length comprises a shortened functional length.

8. A vehicular tire protection apparatus as described in claim 7 wherein said shortened functional length comprises a length from about 12 inches to about 15 inches.

9. A vehicular tire protection apparatus as described in claim 6 said vehicular angle of approach maximization length comprises a swing arc extension maximization length.

10. A vehicular tire protection apparatus as described in claim 9 wherein said swing arc extension maximization length comprises a ground clearance distance and a tire clearance distance.

11. A vehicular tire protection apparatus as described in claim 6 wherein said vehicular angle of approach maximization length comprises a high ground angle of said swing arm in a neutral position.

12. A vehicular tire protection apparatus as described in claim 11 wherein said high ground angle of said swing arm in a neutral position comprises said swing arm substantially vertical to the ground in a neutral position.

13. A vehicular tire protection apparatus as described in claim 6 wherein said vehicular angle of approach maximization length comprises an interstitial distance reduction length.

14. A vehicular tire protection apparatus as described in claim 13 wherein said interstitial distance reduction length comprises a length of said swing arm less than the length of said interstitial distance.

15. A vehicular tire protection apparatus as described in claim 13 wherein said interstitial distance reduction length comprises a length of said swing arm from equal to 110% of said interstitial distance.

16. A vehicular tire protection apparatus as described in claim 6 wherein said proximal tire lead position comprises a reduced interstitial distance proportioned tire lead position.

17. A vehicular tire protection apparatus as described in claim 6 wherein said elastic swing motion arrest comprises a torsion tube.

18. A vehicular tire protection apparatus as described in claim 6 wherein said swing motion arrest comprises a neutral position bias.

19. A vehicular tire protection apparatus as described in claim 18 wherein said neutral position bias comprises a position of said swing arm substantially vertical to the ground.

20. A vehicular tire protection apparatus as described in claim 18 wherein said swing motion arrest comprises a swing arc extension limiter from 0 degrees to 90 degrees in either direction from a starting position substantially vertical to the ground.

21. A vehicular tire protection apparatus as described in claim 6 wherein said swing motion arrest comprises a pivot point displacement force appliance.

22. A vehicular tire protection apparatus as described in claim 6 wherein said swing arm mount configured to be joined to a structural element of a vehicle comprises a crossbar joined to the front of said vehicle, and further comprising multiple tires of said vehicle, and further comprising multiple swing axis pivot points corresponding to the number of tires of said vehicle joined to said swing arm mount, and further comprising a swing arm having a vehicular angle of approach maximization length joined to each said swing axis pivot point and configured to rotate at such swing axis pivot point, and further comprising a ground debris displacement member joined to each said swing arm at a proximal tire lead position corresponding to each said tire of said vehicle.

23. A vehicular tire protection apparatus as described in claim 6 wherein said swing axis pivot point comprises a bi-directional swing axis pivot point.

24. A vehicular tire protection apparatus as described in claim 6 further comprising a rotational arc of said swing arm about said swing axis pivot point having a ground clearance distance.

25. A vehicular tire protection apparatus as described in claim 24 wherein said ground clearance distance comprises a ground debris interference position of said ground debris displacement member.

26. A vehicular tire protection apparatus as described in claim 24 wherein said ground clearance distance comprises from about 0.25 inches to about 5 inches.

27. A vehicular tire protection apparatus as described in claim 6 wherein said swing arm mount configured to be joined to a structural element of a vehicle comprises a swing arm mount configured to be joined to a wheel assembly of said vehicle.

28. A vehicular tire protection apparatus as described in claim 6 further comprising an unpowered ground debris displacement system.

29. A vehicular tire protection apparatus as described in claim 6 further comprising a single position ground debris displacement system.

30. A vehicular tire protection apparatus as described in claim 6 wherein said ground debris displacement member comprises an agricultural debris fold-over member.

31. A vehicular tire protection apparatus comprising:
a swing arm mount configured to be joined to a structural element of a vehicle;
a swing axis pivot point joined to said swing arm mount;
a swing arm having a vehicular angle of approach maximization length joined to said swing axis pivot point and configured to rotate at said swing axis pivot point;
a ground debris displacement member joined to said swing arm at a proximal tire lead position;
wherein said swing arm and said ground debris displacement member comprise a T-shaped assembly.

* * * * *